G. W. Goodwyn,
Rotary Steam Engine.
N° 83,484. Patented Oct. 27, 1868.

Witnesses:
J. C. Keenan.
C. A. Petit.

Inventor:
Geo. W. Goodwyn.
By Munn & Co.
Attorneys.

GEORGE W. GOODWYN, OF PETERSBURG, VIRGINIA.

Letters Patent No. 83,484, dated October 27, 1868.

IMPROVEMENT IN ROTARY STEAM-ENGINES.

The Schedule referred to in these Letters Patent and making part of the same.

*To all whom it may concern:*

Be it known that I, GEORGE W. GOODWYN, of Petersburg, in the county of Dinwiddie, and State of Virginia, have invented a new and improved Rotary Engine; and I do hereby declare that the following is a full, clear, and exact description of the construction and operation of the same, reference being had to the annexed drawings, making a part of this specification, in which—

Figure 1:
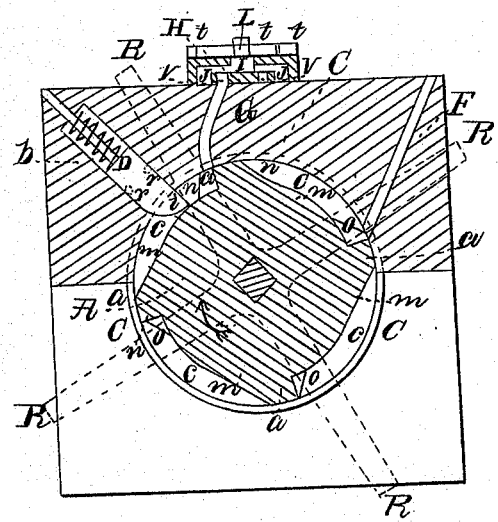
Figure 1 is a vertical cross-section.
Figure 2:
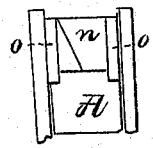
Figure 2 is a detached view of the cam $a$, showing the rear side thereof.
Figure 3:
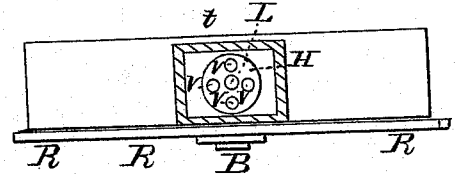
Figure 3 is a top view.

The object of this invention is to furnish a rotary steam-engine which shall be simple and cheap in construction, and shall economize the power of the steam to the greatest possible extent.

In the drawings, A indicates the rotary cylinder, revolving on a shaft, B, in a circular or annular chamber, C, the joints of which are properly packed.

On the perimeter of the cylinder are cams, $a\ a^1\ a^2\ a^3$, which project so far outward as to come in contact with the concave wall of the chamber C, with which they form steam-tight joints, thereby separating the annular space around the cylinder into four steam-spaces, $c\ c^1\ c^2\ c^3$. The cylinder is intended always to move in the direction indicated by the arrows upon it.

In connection with this cylinder is a sliding abutment, D, working in a socket, E, in the wall of the chamber C, and being attached to a spring, $e$, by which its lower end is forced against the perimeter of the cylinder, as seen in fig. 1. The end in contact with the cylinder is bevelled, as seen at $i$, and friction-rolls, $r\ r$, may be provided, to diminish the friction of the sliding abutment against the walls of its socket.

As the cylinder rotates, the abutment rides easily up on the inclined front side, $m$, of the cams $a\ a$, and when their summit has passed beneath it, it drops quickly down behind their abrupt rear walls $n$. In order to prevent its falling here too abruptly, and producing a great jar in the running of the engine, I cause it to slide down slightly-inclined ways $o\ o$, behind each cam, by which it quickly reaches the bottom of its descent, with but little concussion and jar of the working parts.

The cylinder, chamber, and abutment, being thus constructed, I feed the live steam through the port G, causing it to enter behind the cam $a$ the moment the abutment is seated at the bottom of the incline $o$, and, by the direct action of the live steam, to force the cylinder round till the cam reaches any suitable point, say $x$, where I cut off the steam, and move the cylinder till the steam exhausts at F, by means solely of the expansive power of the steam in the space $c$.

The valve-gear which I employ in connection with this engine, is peculiar, combining extreme simplicity with perfect adjustability. It consists of a circular rotary valve, H, fixed to a short spindle, I, with which it revolves, and working in a steam-chest, J, in such a manner that during the most of its revolution on the spindle, its solid disk covers the steam-port G, and prevents the feeding of the steam to the cylinder, while at certain points in its revolution, apertures $v\ v\ v\ v$ in it, take position over the steam-port, and permit the passage of the live steam from the steam-chest to the cylinder. The valve and steam-chest being thus arranged, I attach to the spindle I, outside of the steam chest, several arms, $t\ t\ t\ t$, corresponding in number with the holes $v\ v\ v\ v$ in the valve H, and with the cams $a\ a\ a\ a$ on the cylinder, and I fix to the shaft B the same number of arms, R R R R, making the latter so long, and placing them in such a position that, as the shaft B rotates, the arms R R of said shaft will successively strike the arms $t\ t$ of the spindle, and partially rotate the latter, and with it the valve H.

Now, by properly arranging the arms on the shaft, those on the spindle, the cams $a\ a\ a\ a$, the holes $v\ v\ v\ v$, and the induction and eduction-ports, the engine can be made to work its own valves, and to let on or cut off the steam at any desired points in the revolution of the shaft; and by altering the length or position of the arms $t\ t$, or the position of the arms R R, or the size, shape, or position of the apertures $v\ v$, the cut-off can be adjusted, regulated, and controlled, as may be desired.

Having thus described my invention,

What I claim as new, and desire to secure by Letters Patent, is—

1. The combination of the rotary valve H with the arms $t\ t\ t$, R R R, when so constructed and operating that, by the rotation of the main shaft, the arms R R shall be caused to strike and turn the valve H, substantially as described.

2. The arrangement of the shaft B with the arms R R R, $t\ t\ t$, the rotary valve H, and the induction-port G, substantially as described.

To the above specification of my invention, I have signed my hand, this 21st day of April, 1868.

GEO. W. GOODWYN.

Witnesses:
CHAS. A. PETTIT,
SOLON C. KEMON.